United States Patent
Friesen

(10) Patent No.: US 6,206,105 B1
(45) Date of Patent: Mar. 27, 2001

(54) FORWARDLY FOLDING TOOL BAR

(76) Inventor: Milford E. Friesen, One S. Douglas Rd., Douglas, NE (US) 68344

( * ) Notice: Subject to any disclaimer, the term of this patent is extended or adjusted under 35 U.S.C. 154(b) by 0 days.

(21) Appl. No.: 09/311,080

(22) Filed: May 13, 1999

(51) Int. Cl.$^7$ .................................................. A01B 49/00
(52) U.S. Cl. ........................... 172/311; 172/456; 111/57; 111/54
(58) Field of Search ..................... 172/311, 452, 172/456, 457, 458, 310, 669, 668, 776, 677; 280/412, 413, 407; 111/53, 54, 55, 56, 57, 59

(56) References Cited

U.S. PATENT DOCUMENTS

| | | | |
|---|---|---|---|
| 2,912,022 | * | 11/1959 | Ver Ploeg et al. ...................... 144/2 |
| 3,568,740 | * | 3/1971 | Speakman ................................ 144/2 |
| 4,529,040 | * | 7/1985 | Grollimund .......................... 172/311 |
| 4,582,143 | * | 4/1986 | Pratt ..................................... 172/311 |
| 4,646,851 | * | 3/1987 | Duello .............................. 172/311 X |
| 4,721,168 | * | 1/1988 | Kinzenbaw ......................... 172/311 |
| 5,088,563 | * | 2/1992 | Shidler ............................. 172/311 X |
| 5,113,956 | | 5/1992 | Friesen et al. ...................... 172/311 |
| 5,346,019 | * | 9/1994 | Kinzenbaw et al. ................. 172/311 |
| 5,429,195 | * | 7/1995 | Turnis ................................. 172/311 |
| 5,488,996 | * | 2/1996 | Barry et al. .......................... 172/311 |
| 5,647,440 | * | 7/1997 | Barry et al. .......................... 172/311 |

OTHER PUBLICATIONS

White Brochure "6512/6515 White Planter".
White Brochure "6500 Series Narrow Row, Narrow Transport, Wing Fold Frame".
White Brochure "6500 Series Narrow Row Planters, Forward Fold".

* cited by examiner

Primary Examiner—Victor Batson
(74) Attorney, Agent, or Firm—Zarley, McKee, Thomte, Voorhees & Sease; Dennis L. Thomte

(57) ABSTRACT

A forwardly folding tool bar including a center tool bar section having wing tool bar sections pivotally secured to the outer ends thereof. The wing tool bar sections are pivotally movable from a field position to a transport position. In the field position, the wing tool bar sections are parallel to and extend outwardly from the outer ends of the center tool bar section. When the wing tool bar sections are moved to their transport positions, the wing tool bar sections pivotally move approximately 180° with respect to the center tool bar section so that the wing tool bar sections are positioned in front of the outer ends of the center tool bar section. A telescoping tongue is also provided on the tool bar section which includes telescoping tongue sections which are automatically locked and unlocked.

8 Claims, 8 Drawing Sheets

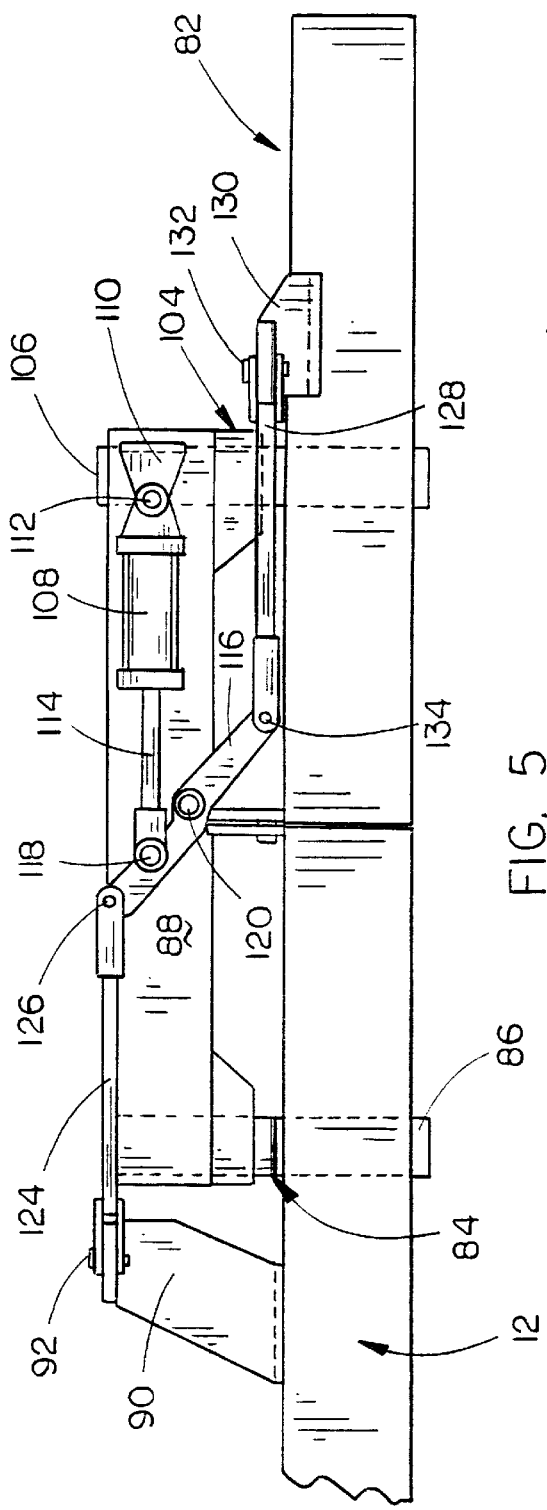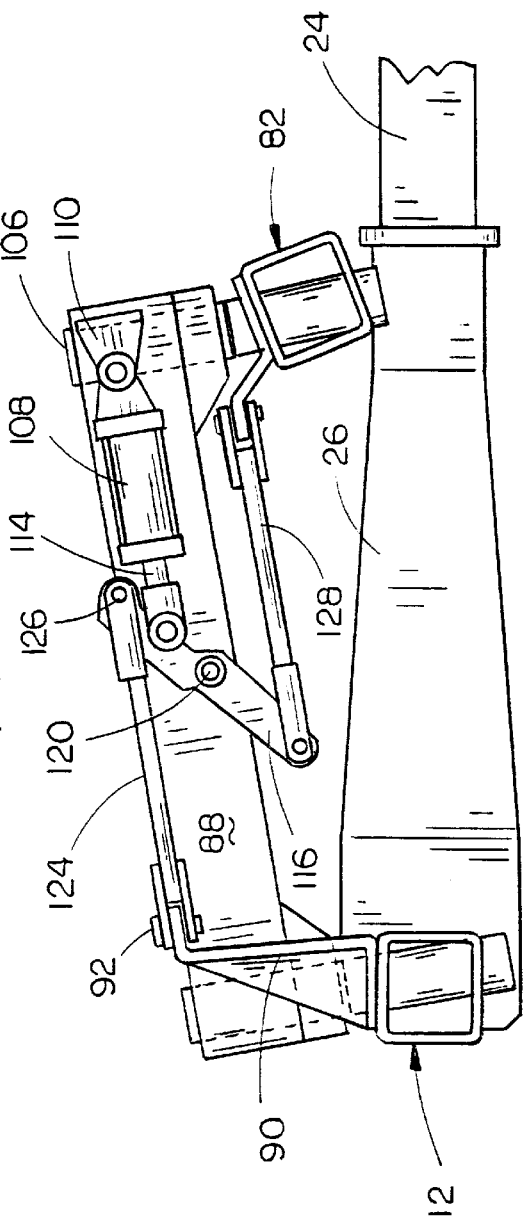

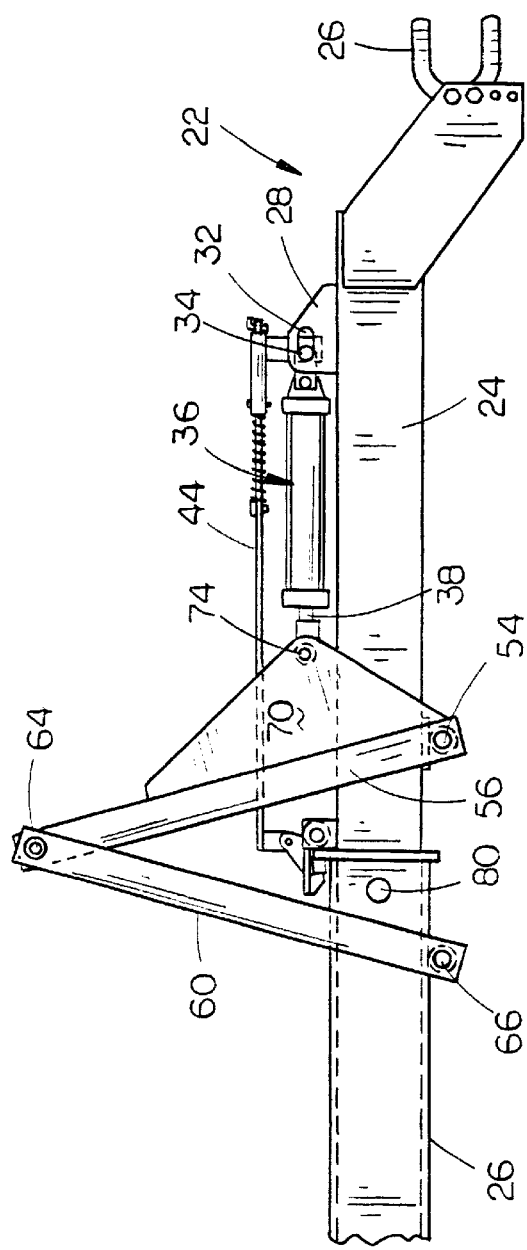
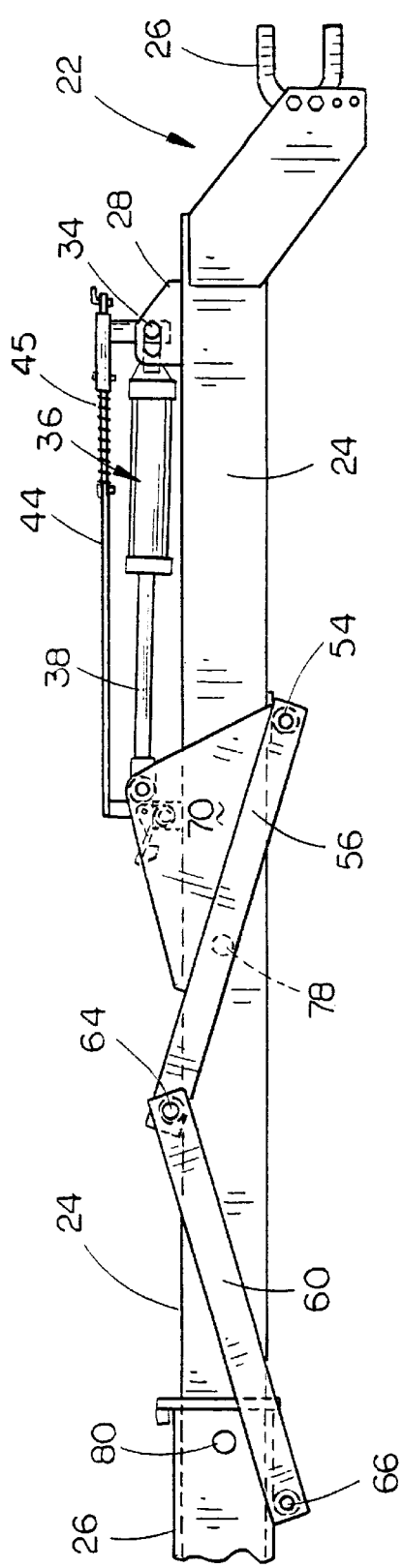
FIG. 8
FIG. 9

FORWARDLY FOLDING TOOL BAR

BACKGROUND OF THE INVENTION

1. Field of the Invention

This invention relates to a folding tool bar and more particularly to a forwardly folding tool bar.

2. Description of the Related Art

Tool bars are commonly used in farming operations. The conventional tool bars normally consist of a transversely extending tool bar or frame member having a hitch secured thereto which extends forwardly therefrom for attachment to a prime mover. Attachments such as cultivators, planter units, stalk cutters, etc., are mounted on the tool bar to perform various farming operations. A major problem associated with conventional tool bars is that the working or field width thereof must be substantially reduced to enable the implement to be transported from one location to another. Many types of tool bars employ a center tool bar section having wing tool bar sections extending outwardly therefrom. In certain of the prior art tool bars, the wings are pivoted from a substantially horizontal working field position to an upright transport position. In most folding tool bars of this type, the upright position of the wings is not as stable as desired and may create undesirable stress on certain components of the tool bar.

A further problem associated with the conventional folding tool bars is that the wheels which support the tool bar interfere with the mounting of various attachments on the tool bar due to the location of the wheels on the tool bar. Yet another disadvantage of the conventional prior art tool bars is that they are not able to accept narrow row attachments. Yet another disadvantage of the conventional prior art tool bars is that they are difficult to move from the field position to the transport position and vice versa.

Applicant's earlier U.S. Pat. No. 5,113,956 solved many of the problems associated with the prior art, but this invention is believed to be an advance over the prior art and advance over applicant's earlier patent.

SUMMARY OF THE INVENTION

A forwardly folding tool bar is described which includes a center tool bar section which is disposed transversely to the direction of travel of the tool bar and which has a forward side, a rearward side, and opposite ends. An elongated tongue is secured to the center tool bar section and extends forwardly therefrom for connection to a prime mover. The elongated tongue is telescopic and may be moved between an extended position and a retracted position. First and second wing tool bar sections are pivotally secured to the center tool bar section at the opposite ends thereof and are pivotally movable between field and transport positions. Each of the first and second wing tool bar sections has a forward side, a rearward side, a first end and a second end. The first and second wing tool bar sections, when in their field position, are parallel to and aligned with the center tool bar section and having their first ends positioned adjacent the ends of the center tool bar section. The first and second wing tool bar sections, when in their said transport position, are positioned forwardly of the center tool bar section at the ends thereof and are generally parallel thereto with their forward sides facing generally rearwardly towards the center tool bar section. Hydraulic cylinders are provided for pivoting the first and second wing tool bar sections between their field and transport positions. A first linkage interconnects the center tool bar section with the first tool bar section for pivoting the first wing tool bar section approximately 180° as the first wing tool bar section is pivoted between its field and transport position. A second linkage interconnects the center tool bar section with the second wing tool bar section for pivoting the second wing tool bar section approximately 180° as the second wing tool bar section is pivoted between its field and transport positions.

It is therefore a principal object of the invention to provide an improved forwardly folding tool bar.

Still another object of the invention is to provide a forward folding tool bar including a center tool bar section and first and second wing tool bar sections at the outer ends of the center tool bar section with the first and second wing tool bar sections being pivotally moved approximately 180° when they are pivoted between their field and transport positions.

Still another object of the invention is to provide a forwardly folding tool bar which is adapted to accept narrow row attachments such as planter units or the like.

Still another object of the invention is to provide a forwardly folding tool bar which is quickly and easily moved from a working field position to a transport position and vice versa.

Still another object of the invention is to provide a forwardly folding tool bar which is economical of manufacture and durable in use.

These and other objects of the present invention will be obvious to those skilled in the art.

BRIEF DESCRIPTION OF THE DRAWINGS

FIG. 5 is a partial front elevational view of one of the wing tool bar sections;

FIG. 6 is a partial side elevational view of one of the wing tool bar sections in its transport position;

FIG. 8 is a partial side elevational view of the telescopic tongue in its field or retracted position;

FIG. 9 is a view similar to FIG. 8 except that the tongue has been moved to its extended or transport position.

DESCRIPTION OF THE PREFERRED EMBODIMENT

Figure 1:
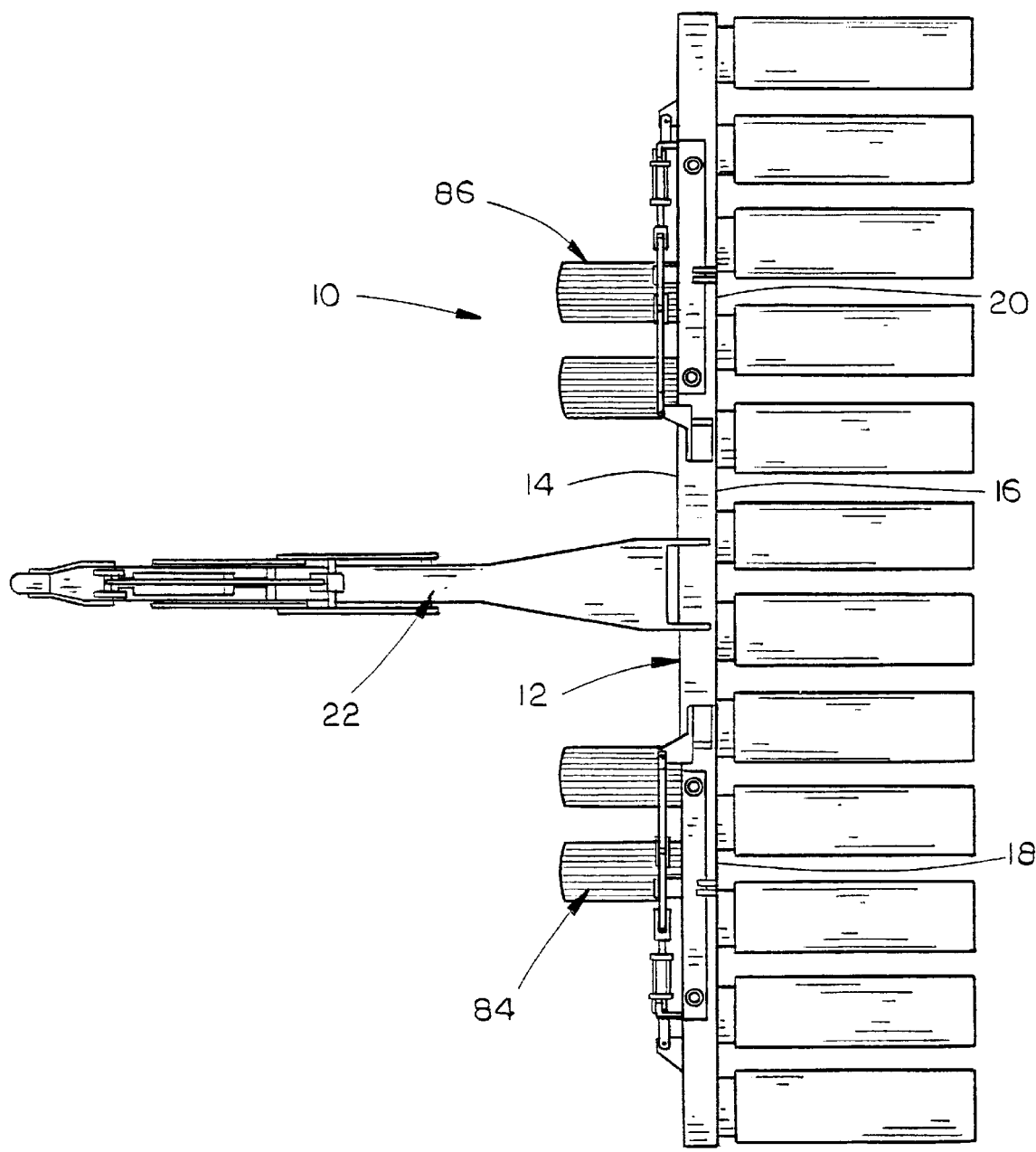
FIG. 1 is a top elevational view of the tool bar of this invention in its field position.

The forward folding tool bar of this invention is referred to generally by the reference numeral 10. Tool bar 10 includes a center tool bar section 12 which is disclosed transversely to the direction of travel of the tool bar. For purposes of description, the center tool bar section 12 will be described as having a forward side 14, rearward side 16, and opposite ends 18 and 20. Elongated tongue 22 is operatively secured to the center tool bar section 12 and extends forwardly therefrom for connection to a prime mover. Elongated tongue 22 is length-adjustable so that it may be extended for transport and may be shortened for field operation. Tongue 22 includes a front tongue section 24 and a rear tongue section 26 with front tongue section 24 having a hitch 27 at its forward end for connection to a prime mover such as a tractor or the like. Front tongue section 24 has a pair of spaced-apart brackets 28 and 30 which extend upwardly therefrom at the forward end thereof and which each have an elongated, horizontally disposed slot 32 formed therein adapted to removably receive pin 34 therein. The base end of hydraulic cylinder 36 is pivotally connected to the pin 34 and includes a cylinder rod or shaft 38 extending rearwardly therefrom. Arm 40 is mounted on pin 34 between brackets 28 and 30 and extends upwardly therefrom, as seen in the drawings. Tube 42 is welded to the upper end of arm 40 and is disposed parallel to the longitudinal axis of the tongue. Rod 44 is mounted in the tube 42 and has pin 43 mounted thereon forwardly of tube 42. As seen in the drawings, rod 44 extends rearwardly from tube 42 and has a spring 45 mounted thereon which is held in place by a pin 47 extending through rod 44.

Figure 10:
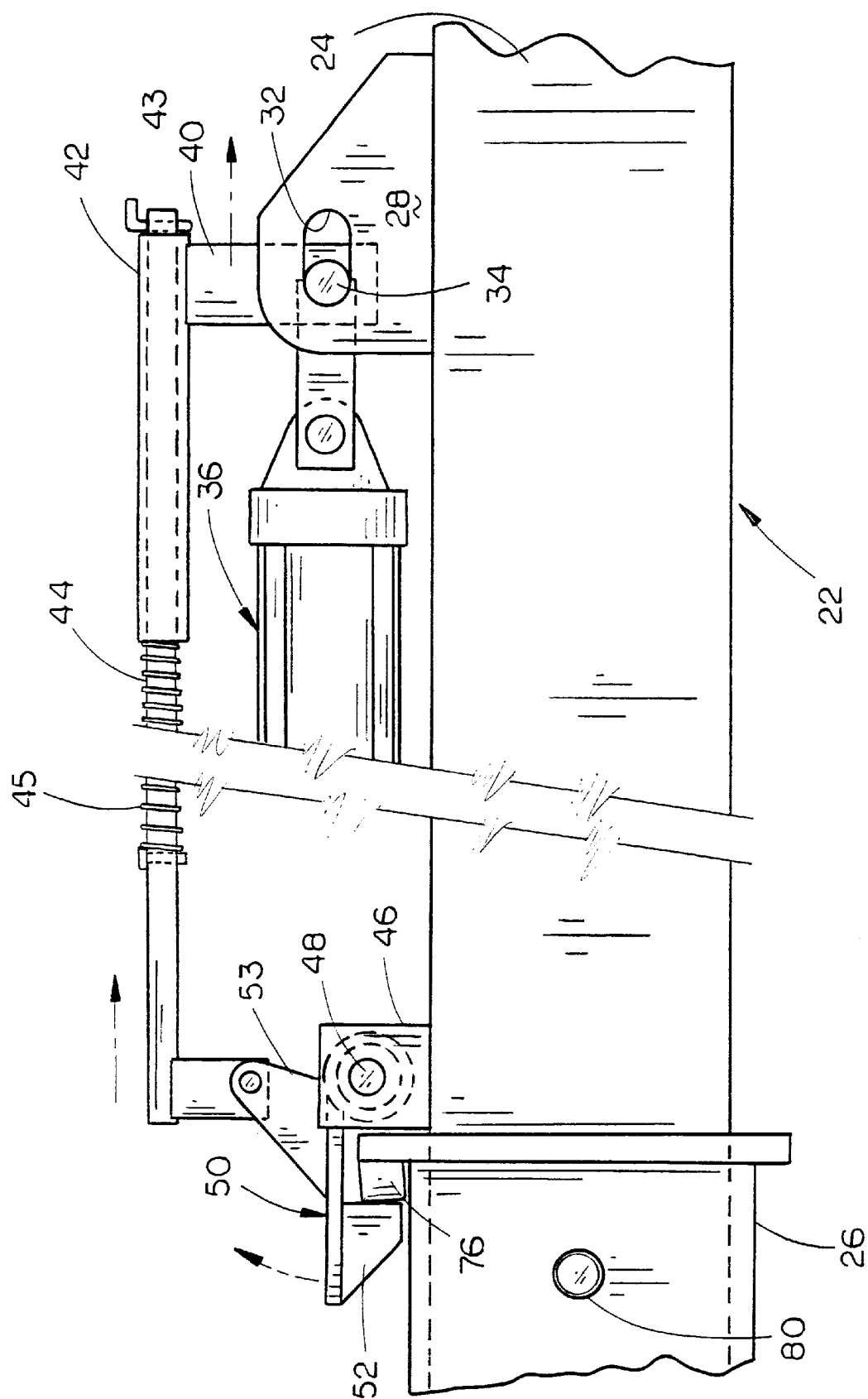
FIG. 10 is a partial side elevational view of the tongue.

Bracket 46 is welded to the upper surface of tongue section 24 and has a pin 48 rotatably pivotally mounted therein. Latch 50 is secured to pin 48 for movement therewith and includes a locking lug 52 for a purpose to be described hereinafter. Arm 53 is secured to pin 48 by welding or the like and extends upwardly therefrom, with its upper end being pivotally secured to the rearward end of rod 44, as seen in FIG. 10. Thus, when pin 34 is in the rearward end of the slots 32 in brackets 28 and 30, latch 50 will be horizontally disposed (FIG. 10). When pin 34 is in the forward ends of the slots 32 formed in brackets 28 and 30, latch 50 will be pivotally moved upwardly to an unlocked position, as seen in FIG. 9, as will be described in greater detail hereinafter.

Pin 54 is welded to the underside of tongue section 24 intermediate the length thereof and has a pair of arms 56 and 58 pivotally mounted on the outer ends thereof on opposite sides of the tongue section 24. A pair of elongated arms 60 and 62 are positioned on opposite sides of the tongue and have their forward ends pivotally secured to the rearward ends of arms 56 and 58, respectively, by means of a pin 64 or a pair of pins, if desired. The rearward ends of arms 60 and 62 are pivotally mounted on the outer ends of a pin 66 which is welded to the underside of tongue section 26 which slidably receives tongue section 24, as illustrated in the drawings.

Plates 70 and 72 are welded to the forward ends of bars 56 and 58, respectively, and extend upwardly therefrom on opposite sides of the tongue section 24. The rearward end of shaft 38 of hydraulic cylinder 36 is pivotally connected to the plates 70 and 72 by means of pin 74. As will be described in more detail hereinafter, locking latch 52 is adapted to extend over bar 76 which is welded to the top surface of tongue section 26 at the forward end thereof. If the tongue is not extended and retracted by means of a hydraulic cylinder, as shown, tongue sections 24 and 26 are provided with registering openings 78 and 80 adapted to receive a pin therethrough to maintain tongue section 24 in the retracted position with respect to tongue section 26. As seen in the drawings, the rearward end of tongue section 26 is welded to the forward end of center tool bar section 12.

First and second wing tool bar sections 82 and 82' are pivotally secured to the center tool bar section 12 adjacent the outer ends thereof and are pivotally movable between field and transport positions, as will be described hereinafter.

Inasmuch as wing tool bar sections 82 and 82' are identical, only wing tool bar section 82 will be described in detail with "'" indicating identical structure on wing tool bar section 82'. Ground-engaging wheel assemblies 84 and 86 are mounted on the outer ends of center tool bar section 12 and are hydraulically operated to raise and lower center tool bar section 12 and the wing tool bar sections 82 and 82' in conventional fashion.

Pivot pin assembly 84 including a pivot pin 86 is positioned on center tool bar section 12 inwardly of end 18 and has a support arm 88 pivotally mounted thereon.

Figure 4:
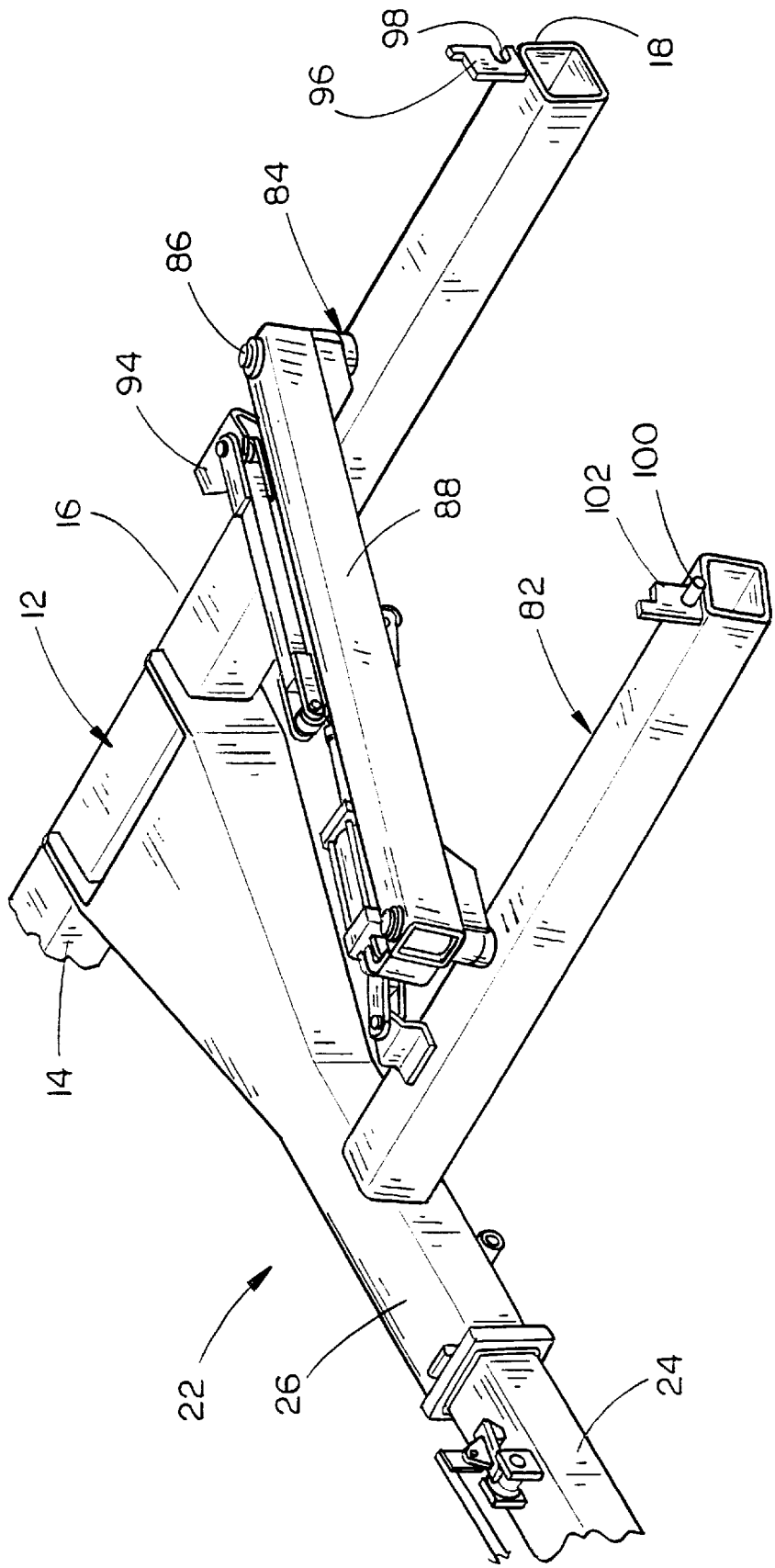
FIG. 4 is a partial perspective view illustrating one of the wing tool bar sections being pivoted to its transport position.
Figure 7:
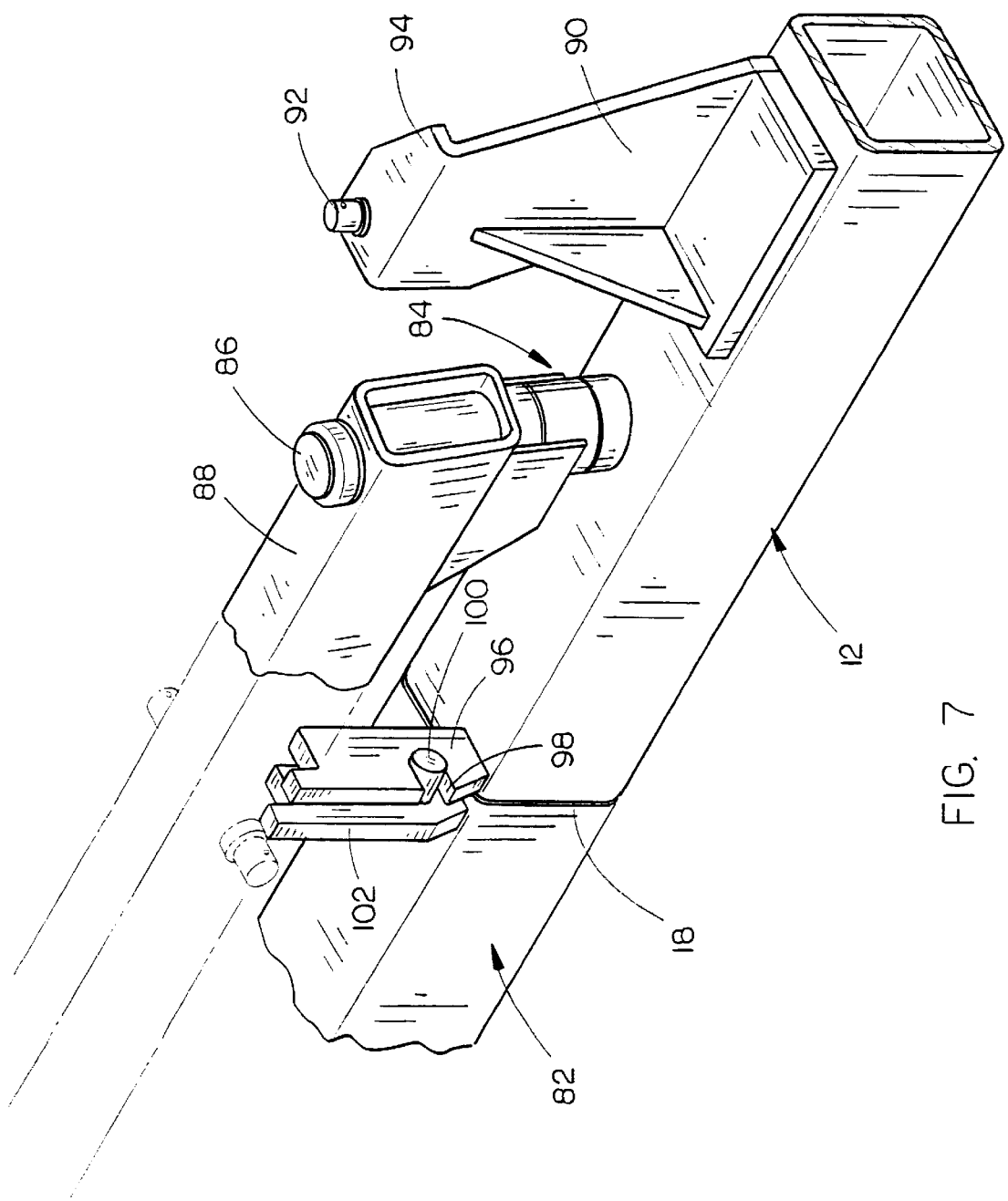
FIG. 7 is a partial perspective view illustrating the manner in which one of the tool bar sections is pivoted to the center tool bar section.

Pivot pin 86 is not vertically disposed, but is disposed at a slight angle with respect to vertical so that the upper end of pin 84 is disposed slightly rearwardly of the lower end thereof so that the support arm 88 will move upwardly as it is pivoted from the full line position of FIG. 7 to the full line position of FIG. 4. Support 90 is also secured to center tool bar section 12 inwardly of pivot pin assembly 84 and is adapted to receive a pin 92 extending through an opening formed in flange 94 at the upper end of support 90.

As seen in FIG. 7, a stop plate 96 is secured to tool bar section 12 adjacent end 18 and extends upwardly therefrom. Stop plate 96 includes a U-shaped opening 98 formed in the lower rearward end thereof which is adapted to receive pin 100 therein. Pin 100 is secured to stop plate 102 which is secured to the inner end of tool bar section 82, as best illustrated in FIG. 7. When the wing tool bar section 82 is moved to its field position, as illustrated in FIG. 7, pin 100 is received in opening 98 to aid in stabilizing wing tool bar section 92 with respect to center tool bar section 12.

Pivot pin assembly 104 is mounted on wing tool bar section 82 outwardly of the inner end thereof, as seen in FIG. 5, and includes a pivot pin 106 which is angularly disposed with respect to wing tool bar section 82 in the same fashion as pivot pin 86 is angularly disposed with respect to center tool bar section 12. The outer end of support arm 88 is pivotally mounted on the pivot pin 106 in conventional fashion. The base end of hydraulic cylinder 108 is pivotally connected to a bracket 110 secured to the outer end of support arm 88 by means of pin 112. The rod 114 of cylinder 108 is pivotally connected to a linkage or bar 116 by pin 118. Linkage 116 is pivotally secured to support arm 88 by pin 120. The inner end of an elongated link is pivotally connected to the support 90 by the pin 92 and is pivotally connected at its outer end to the upper end of linkage 116 by means of pin 126. The outer end of an elongated link 128 is pivotally connected to a support or bracket 130, which is secured to wing tool bar section 82, by means of pin 132. The inner end of link 128 is pivotally connected to the lower end of linkage 116 by means of pin 134.

FIG. 5 is a front elevational view of the outer end of center tool bar section 12 and the wing tool bar section 82 when the tool bar is in its field position. In such a position, the planter units 136 would be positioned rearwardly of the tool bar. When it is desired to move the wing tool bar section 82 from the field position of FIG. 1 to the transport position of FIG. 2, hydraulic cylinder 108 is retracted which causes the linkage 116 to be rotated in a clockwise direction, as viewed in FIG. 5, about pin 120. The clockwise rotation of linkage 116 about pin 120 causes the wing tool bar section 82 to be pivotally moved from the field position of FIG. 5 to the transport position of FIGS. 2 and 4. The retraction of rod 114 into cylinder 108 causes the support arm 88 to be pivotally moved from the position of FIG. 5 to the position of FIG. 4 and causes the wing tool bar section 82 to be pivotally moved approximately 180° from its field position. In the transport position of FIG. 2, the planter units 136 are positioned forwardly of the wing tool bar section 82 which ensures that the planter units 136 will not strike the wheel unit 84.

The fact that the pivot pins 86 and 106 are slightly angularly disposed with respect to the tool bar sections ensures that the wing tool bar section 82 will be slightly moved upwardly as it is moved from its field position to its transport position.

The positioning of the pivot pin assembly 84 inwardly of the end 18 of center tool bar section 12 is quite important in that it enables the support arm 88 and the pivot pin 106 to properly support the wing tool bar section 82.

Assuming that the tool bar of this invention is in its field position of FIG. 1, tongue 22 will be in the position of FIG. 8 with the tongue section 24 being telescopically received in the interior of tongue section 26. In the position of FIG. 8, latch 50 will be in the position of FIG. 10 so that it is positioned behind bar 76 to maintain the tongue 22 in its retracted position. In the retracted position, pin 34 will be in the rearward ends of slots 32 formed in the brackets 28 and 30. In the field position, pin 100 which extends from plate 102 will be received in the opening 98, as illustrated in FIG. 7, as previously described.

It is preferred that the hydraulic cylinder 36 be coordinated with cylinder 108 on wing tool bar section 82 and the cylinder 108' on the wing tool bar section 82' so that rod 38 of cylinder 36 will be extended simultaneously with the retraction of cylinder rods of the cylinders 108 and 108'.

Figure 2:
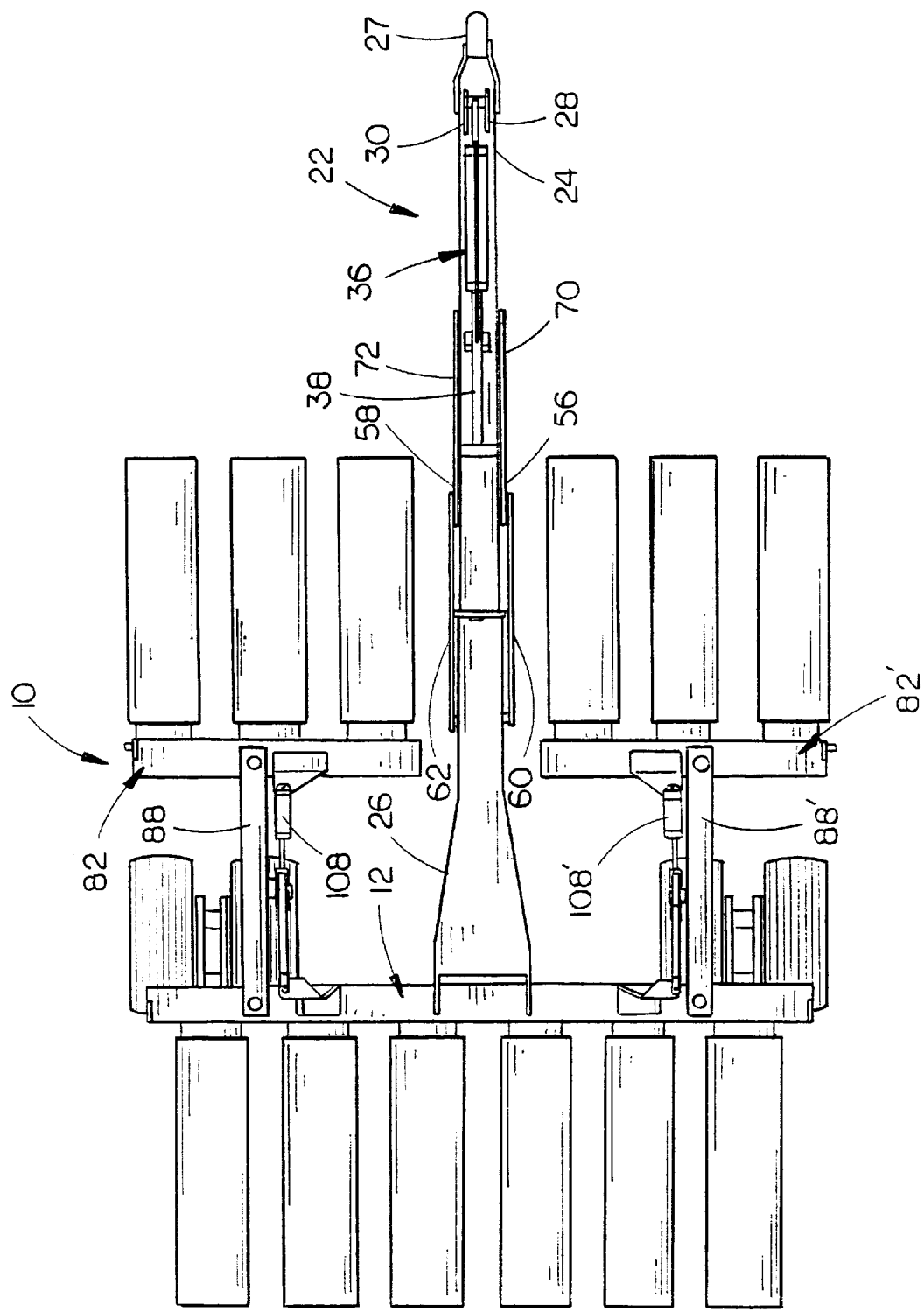
FIG. 2 is a top elevational view of the tool bar of this invention in its transport position.
Figure 3:
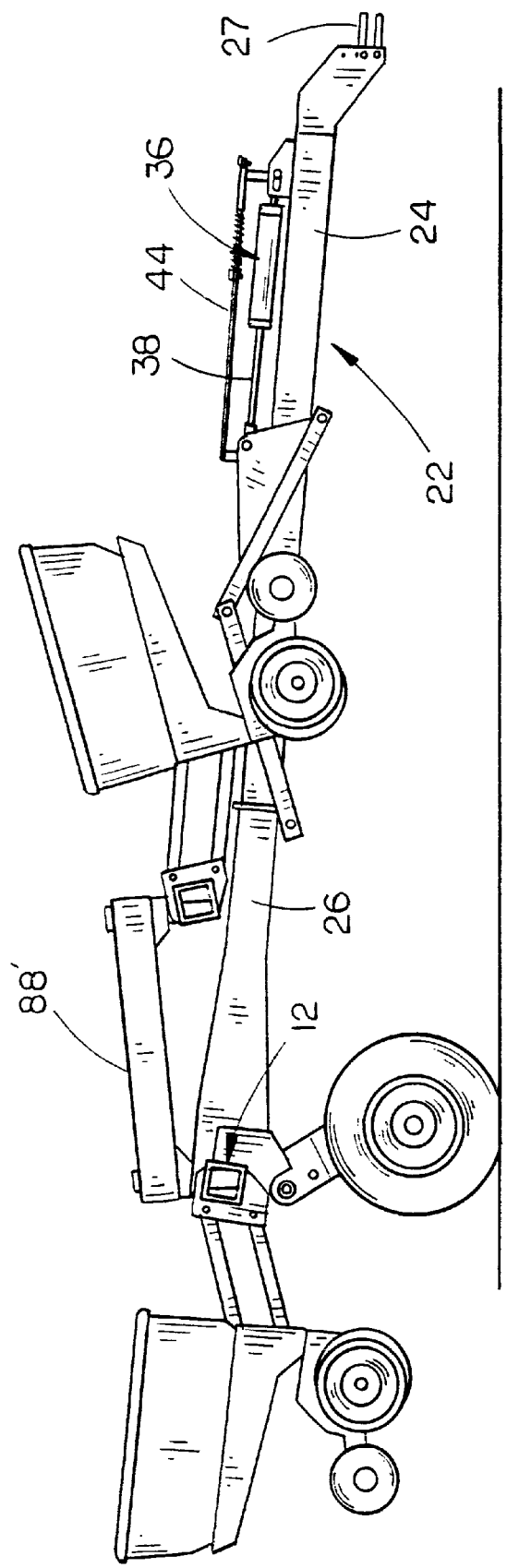
FIG. 3 is a side view of the folding tool bar of this invention with one of the wing tool bar sections being pivoted to its transport position and illustrating the other wing tool bar section in its field position.

The initial extension of rod 38 of cylinder 36 will cause pin 34 to move forwardly in the openings 32 in brackets 28 and 30 which will cause arm 40, tube 42 and rod 44 to be moved forwardly, as illustrated by the arrows in FIG. 10. The forward movement of the rod 44 causes the latch 50 to pivot upwardly about pin 48 so that tongue section 24 may slidably move outwardly with respect to tongue section 26 to provide sufficient clearance for the wing sections which are also simultaneously pivotally moving from their field positions to their transport positions while the cylinder 36 is being extended. The. retraction of the cylinder rods into the cylinders 108 and 108' causes the wing tool bar sections 82 and 82' to be pivotally moved approximately 180° from their field position to their transport position which is illustrated in FIG. 2. In the transport position of FIG. 2, the support arms 88 and 88' extend substantially transversely forwardly from center tool bar section 12. In the transport position of FIG. 2, the center tool bar sections 82 and 82' are substantially parallel to and aligned with center tool bar section 12.

When it is desired to move the wing tool bar sections 82 and 82' from the transport position of FIG. 2 to the field position of FIG. 1, hydraulic cylinder 36 is retracted while hydraulic cylinders 108 and 108' are extended. The extension of the cylinder rods from the cylinders 108 and 108' causes the linkage 116 to be pivoted about pin 120 which causes the wing tool bar sections 82 and 82' to return to their field positions. As cylinder 38 is retracted, tongue section 24 slidably moves inwardly into tongue section 26 until the latch 52 pivotally passes over bar 76 which is permitted by rod 44 moving forwardly, against the resiliency of spring 45, with respect to tube 42.

The retraction of hydraulic cylinder 36 also causes the pin 34 to move to the rearward end of the openings 32 and brackets 28 and 30 which enables the latch 50 to pivotally move downwardly into locking engagement with element 76 through the resiliency of spring 45 urging rod 44 rearwardly.

Thus it can be seen that a novel forwardly folding tool bar has been provided which accomplishes at least all of its stated objectives.

I claim:
1. A forwardly folding tool bar, comprising:

a center tool bar section disposed transversely to a direction of travel of the tool bar;

said center tool bar section having a forward side, a rearward side, and opposite ends;

an elongated tongue operatively secured to said center tool bar section and extending forwardly therefrom for connection to a prime mover;

a first wing tool bar section pivotally secured to said center tool bar section adjacent one end thereof and being pivotally movable between field and transport positions;

a second wing tool bar section pivotally secured to said center tool bar section adjacent the other end thereof and being pivotally movable between field and transport positions;

each of said first and second wing tool bar sections having a forward side, a rearward side, a first end and a second end;

said first wing tool bar section, when in its said field position being generally parallel to said center tool bar section and having its said first end positioned adjacent said one end of said center tool bar section;

said second wing tool bar section, when in its said field position, being generally parallel to said center tool bar section and having its said first end positioned adjacent the other end of said center tool bar section;

said first wing tool bar section, when in its said transport position, being positioned forwardly of said center tool bar section at said one end thereof with its said forward side facing generally rearwardly towards said center tool bar section;

said second wing tool bar section, when in its said transport position, being positioned forwardly of said center tool bar section at said other end thereof with its said forward side facing generally rearwardly towards said center tool bar section;

a first upstanding pivot pin assembly on said center tool bar section inwardly of said one end;

a second upstanding pivot pin assembly on said center tool bar section inwardly of said other end;

a third upstanding pivot pin assembly on said first wing tool bar section outwardly of said first end thereof;

a fourth upstanding pivot pin assembly on said second wing tool bar section outwardly of said first end thereof;

a first support arm having inner and outer ends;

said inner end of said first support arm being secured to said first pivot pin assembly;

said outer end of said first support arm being secured to said third pivot pin assembly;

said first support arm being positioned above said one end of said center tool bar section and said first wing tool bar section;

a second support arm having inner and outer ends;

said inner end of said second support arm being secured to said second pivot pin assembly;

said outer end of said second support arm being secured to said fourth pivot pin assembly;

said second support arm being positioned above said other end of said center tool bar section and said second wing tool bar section;

said first and second support arms being disposed generally transversely with respect to said center tool bar section when said first and second wing tool bar sections are in their said transport positions.

2. The tool bar of claim 1 wherein a first support is secured to the center tool bar section inwardly of said first pivot pin assembly; a first elongated link, having inner and outer ends, pivotally secured at its inner end to said first support and extending therefrom; a second support secured to said first wing tool bar section outwardly of said third pivot pin assembly; a second elongated link, having inner and outer ends, pivotally secured at its outer end to said second support and extending inwardly therefrom; a third elongated link, having inner and outer ends, pivotally secured at its outer end to the inner end of said second link and pivotally secured at its inner end to said outer end of said first link; said third link being pivotally secured intermediate its length to said first support arm; a first hydraulic cylinder, having first and second ends, pivotally secured at its said first end to said first support arm adjacent the outer end thereof; said first hydraulic cylinder being pivotally secured at its said second end to said third link; a third support is secured to the center tool bar section inwardly of said second pivot pin assembly; a fourth elongated link, having inner and outer ends, pivotally secured at its inner end to said third support and extending therefrom; a fourth support secured to said second wing tool bar section outwardly of said fourth pivot pin assembly; a fifth elongated link, having inner and outer ends, pivotally secured at its outer end to said fourth support and extending inwardly therefrom; a sixth elongated link, having inner and outer ends, pivotally secured at its outer end to the inner end of said fifth link and pivotally secured at its inner end to said outer end of said fourth link; said sixth link being pivotally secured intermediate its length to said second support arm; a second hydraulic cylinder, having first and second ends, pivotally secured at its said first end to said second support arm adjacent the outer end thereof; said second hydraulic cylinder being pivotally secured at its said second end to said sixth link.

3. A forwardly folding tool bar, comprising:
a center tool bar section disposed transversely to a direction of travel of the tool bar;
said center tool bar section having a forward side, a rearward side, and opposite ends;
an elongated tongue operatively secured to said center tool bar section and extending forwardly therefrom for connection to a prime mover;
a first wing tool bar section pivotally secured to said center tool bar section adjacent one end thereof and being pivotally movable between field and transport positions;
a second wing tool bar section pivotally secured to said center tool bar section adjacent the other end thereof and being pivotally movable between field and transport positions;
each of said first and second wing tool bar sections having a forward side, a rearward side, a first end and a second end;
said first wing tool bar section, when in its said field position, being aligned with and parallel to said center tool bar section, and having its said first end positioned adjacent said one end of said center tool bar section;
said second wing tool bar section, when in its said field position, being aligned with and parallel to said center tool bar section, and having its said first end positioned adjacent the other end of said center tool bar section;

said first wing tool bar section, when in its said transport position, being positioned forwardly of said center tool bar section at said one end thereof with its said forward side facing generally rearwardly towards said center tool bar section;
said second wing tool bar section, when in its said transport position, being positioned forwardly of said center tool bar section at said other end thereof with its said forward side facing generally rearwardly towards said center tool bar section;
said tongue comprising front and rear tongue sections;
each of said front and rear tongue sections having rearward and forward ends;
said rearward end of said front tongue section being telescopically received by said forward end of said rear tongue section;
said front tongue section being normally partially retracted in a field position within said rear tongue section, but being extendible therefrom to a transport position;
a first elongated arm assembly having forward and rearward ends; said forward end of said first arm assembly being pivotally secured to said front tongue section;
a second elongated arm assembly having forward and rearward ends;
said forward end of said second arm assembly being pivotally connected to said rearward end of said first arm assembly;
said rearward end of said second arm assembly being pivotally connected to said rear tongue section;
a hydraulic cylinder having a base end and a rod end;
said base end of said hydraulic cylinder being connected to said front tongue section;
said rod end of said hydraulic cylinder being pivotally connected to said first arm assembly;
the extension of said hydraulic cylinder causing said front tongue section to be extended from said rear tongue section;
the retraction of said hydraulic cylinder causing said front tongue section to be retracted into said rear tongue section.

4. The tool bar of claim 3 wherein a locking means interconnects said front and rear tongue sections when said front tongue section is in its said field position.

5. The tool bar of claim 3 wherein said locking means is operatively connected to said hydraulic cylinder whereby said locking means will be unlocked upon said hydraulic cylinder being initially extended when said front tongue section is in its said field position.

6. A folding tool bar, comprising:
a center tool bar section, having opposite ends, disposed transversely to a direction of travel of the tool bar;
a first wing tool bar section pivotally secured to said center tool bar section adjacent one end thereof and being pivotally movable between field and transport positions;
a second wing tool bar section pivotally secured to said center tool bar section adjacent the other end thereof and being pivotally movable between field and transport positions;
an elongated tongue operatively secured to said center tool bar section and extending forwardly therefrom for connection to a prime mover;
said tongue comprising front and rear tongue sections;

each of said front and rear tongue sections having rearward and forward ends;

said rearward end of said front tongue section being telescopically received by said forward end of said rear tongue section;

said front tongue section being normally partially retracted in a field position within said rear tongue section, but being extendible therefrom to a transport position;

a first elongated arm assembly having forward and rearward ends;

said forward end of said first arm assembly being pivotally secured to said front tongue section;

a second elongated arm assembly having forward and rearward ends;

said forward end of said second arm assembly being pivotally connected to said rearward end of said first arm assembly;

said rearward end of said second arm assembly being pivotally connected to said rear tongue section;

a hydraulic cylinder having a base end and a rod end;

said base end of said hydraulic cylinder being connected to said front tongue section;

said rod end of said hydraulic cylinder being pivotally connected to said first arm assembly;

the extension of said hydraulic cylinder causing said front tongue section to be extended from said rear tongue section;

the retraction of said hydraulic cylinder causing said front tongue section to be retracted into said rear tongue section.

7. The tool bar of claim 6 wherein a locking means interconnects said front and rear tongue sections when said front tongue section is in its said field position.

8. The tool bar of claim 7 wherein said locking means is operatively connected to said hydraulic cylinder whereby said locking means will be unlocked upon said hydraulic cylinder being initially extended when said front tongue section is in its said field position.

* * * * *